UNITED STATES PATENT OFFICE.

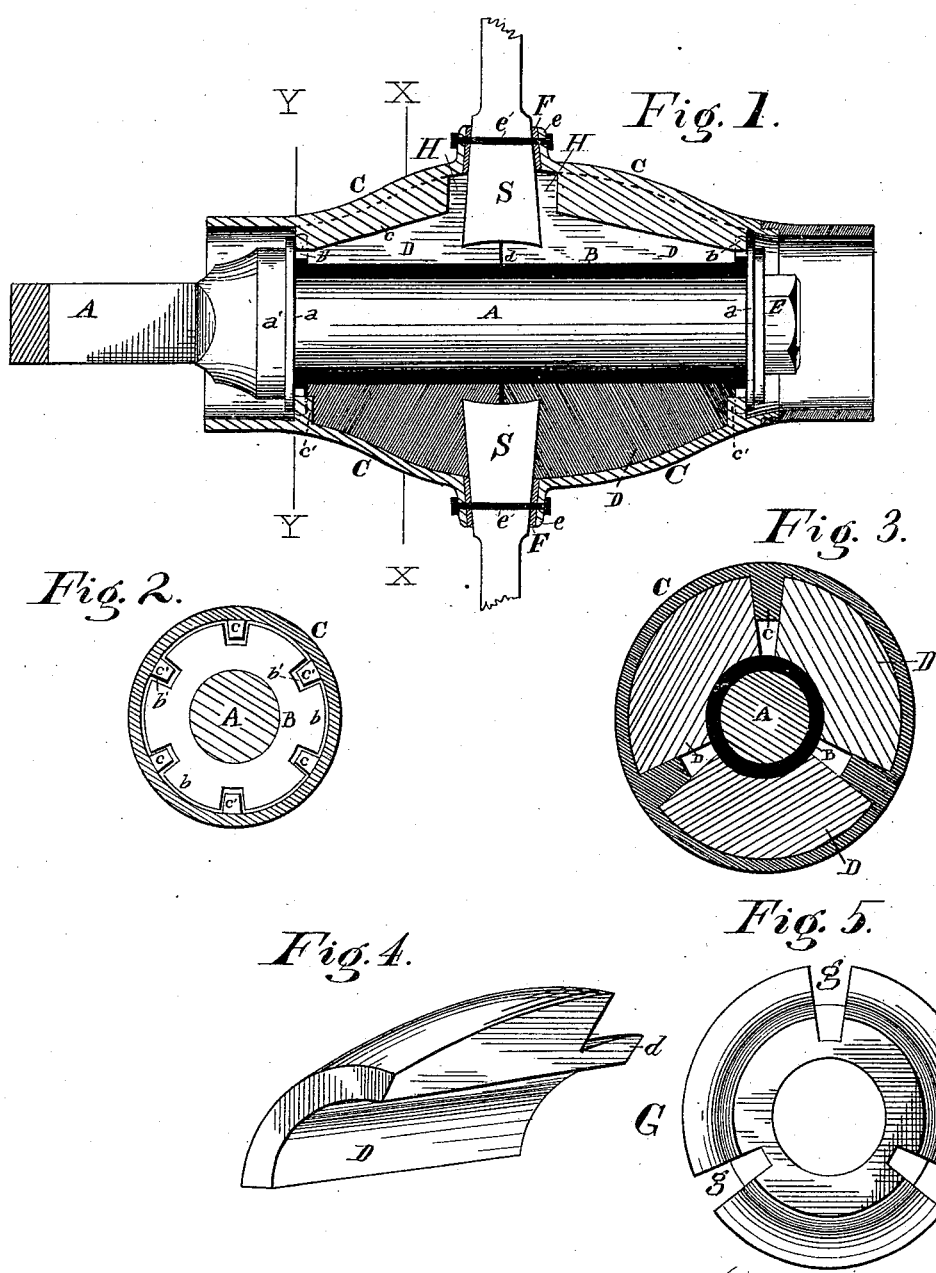

JAMES T. BROWN, OF INDIANAPOLIS, INDIANA.

VEHICLE-WHEEL HUB.

SPECIFICATION forming part of Letters Patent No. 291,873, dated January 15, 1884.

Application filed September 22, 1883. (No model.)

*To all whom it may concern:*

Be it known that I, JAMES T. BROWN, of Indianapolis, in the county of Marion and State of Indiana, have invented certain new and useful Improvements in Vehicle-Wheel Hubs, of which the following is a specification.

My invention relates to that class of vehicle-wheel hubs in which means are provided whereby a certain amount of elasticity is imparted to the wheel itself, so that in passing over irregular ground the wheels assist the springs proper, and by answering more directly to the shocks distribute their effects in a more equable and agreeable manner than can be attained by the springs alone.

More particularly, my invention relates to those hubs in which an elastic filler occupies the space between the outside shell of the hub and the journal-box in which the axle works, so that the whole or major part of the hub shall rest on the elastic filler.

Heretofore hubs have been constructed in which the ends of the hubs alone rested on elastic bearings, or in which the effects of a large internal filler have been counteracted by uniting firmly together the outer hub-shell and the axle-journal box.

To provide a hub in which a greater amount of elastic surface is presented to the hub-shell than is possible in a construction like that first named, and at the same time to provide a hub which is certainly elastic, is the object of my invention.

In the accompanying drawings, Figure 1 represents a central longitudinal section of a hub constructed in accordance with my improvements. Fig. 2 represents a cross-section taken at the line Y Y, Fig. 1. Fig. 3 represents a cross-section through the line X X of Fig. 1. Fig. 4 is a perspective view of a section of the elastic filler. Fig. 5 is an end view of a modification of the elastic filler.

The axle A is preferably provided with the customary shoulder, $a'$, and the end of the spindle of said axle has the usual screw-thread by which the axle-nut E is secured thereto. The journal-box B turns on and is secured in position upon the axle by means of the axle-shoulder $a'$, washer $a$, and nut E. The journal-box B is provided at each end with a flange, $b$, into which notches $b'$ are cut. The washers $a$ are made large enough in diameter to cover the notches $b'$ of flanges $b$ sufficient to prevent end movement of the partitions D, and consequently of the hub itself. The outer shell C of the hub is made in two sections bolted together between the spokes, as shown in Fig. 1. These shells C have ribs $c$ projecting inwardly, as shown in Figs. 1, 2, and 3, and fitting loosely in the notches $b'$, leaving sufficient space between the partitions and the surface of the journal-box within the notch to allow the rubber filler and the shell, &c., to move freely, leaving free space at bottom and sides of the notch to allow of motion from the elasticity of the rubber when the latter is called upon to act. The ribs $c$ fit against the face of the washer $a$, and extend inwardly a greater or less distance, but preferably nearly to the spokes S. The thickness and depth of these ribs will depend upon the uses to which the hub is to be put, thicker and deeper ribs being required for hubs to be used with heavier work.

Between the ribs $c$ are lugs $c'$, attached to shell-sections, and which are preferably as deep as the ribs $c$ are at the point where the latter enter the notches $b'$. These lugs fit into appropriate notches $b'$ in the flanges of the journal-box, and have the same play therein as the ribs $c$ have in their respective notches. The outer faces of these lugs lie in the same vertical plane as the outer faces of the ribs.

Occupying the space between the shells C and the journal-box B are the elastic fillers D. The fillers D meet under the centers of the spokes, but are separated from each other laterally by the ribs $c$, the spaces between the ribs $c$ and journal-box B being left vacant, as shown in Fig. 3. When desired, the ribs $c$ may be made as short as the lugs $c'$, in which case the fillers D will be made to touch each other laterally.

Another modification is that shown by an end view in Fig. 5. In this form the elastic filling is made in two sections only, (viz., a front and rear section,) meeting under the spokes, having an extended reduced portion which lies beneath the bottom of the spokes, and operates as reduced portion $d$ of section D, Fig. 4, does. Each of these sections consists of one piece, G, having notches $g$, in which the ribs c fit. The shells C, being provided with a sufficient number of ribs and lugs, c', will yield in whatever part of the wheel the pressure or strain may come. When a strain or pressure comes on any part of the shells C, they compress the elastic filler, and a number of the ribs and lugs enter deeper into the notches b'. Endwise motion of the shells, resulting from lateral movement of the wheel, is prevented by the lugs and partitions impinging against the faces of the washer a. The shells C, at the ends next to the spokes, are provided with flanges e, through which the bolts or rivets e' are passed to secure the sections together, the spokes S being clamped between the flanges e; and to render the wheel still more elastic I preferably place elastic washers F between the flanges e and the edges of the spokes, as shown in Fig. 1; or, if preferred, these washers e, instead of being separate, may be formed with the filling-sections D. When the ribs c extend as far toward the spokes as they do in the preferred extent of construction—viz., nearly to the spokes—a thin layer, H, of elastic material, integral with the filling D, lies between the inner ends of the ribs and the spokes. When the sections of elastic filling are in position, these layers together form a disk, H, concentric with the hub. A hub of this description aids the springs of the vehicle in which it is used in a very thorough manner, and by reason of its being an elastic body in the center of the wheel relieves that part of the vehicle from much of the strain to which it is ordinarily subjected, thereby saving the wheel from considerable wear and tear, and prolonging its period of usefulness much beyond that of a wheel provided with a common hub.

Besides the above advantages, my improved hub lessens the vibration and jolting of the wheel, prevents splitting of the spokes and breaking of the rim and tire, and lessens the noise of the vehicle.

The number of the lugs c' may be varied, or the latter may be altogether dispensed with, as may be esteemed desirable.

The mode of combining the shells C and the spokes may also be varied, as desired.

What I claim as new, and desire to secure by Letters Patent, is—

1. A vehicle-wheel hub provided with internal longitudinal ribs, in combination with an elastic filler, substantially as and for the purposes specified.

2. The combination of a vehicle-wheel hub provided with internal longitudinal ribs and an elastic filler, a portion of which lies between said ribs and a portion extends beneath the bottom of the spokes, and a journal-box, substantially as and for the purposes specified.

3. The combination of the shells C, provided with the ribs c, stopping a distance short of the spokes, and the elastic filler D and elastic layers or disk H, substantially as and for the purposes specified.

4. The combination of the shells C, provided with the ribs c, stopping a distance short of the spokes, and the elastic filler D, the layers H being integral with the elastic filler D, substantially as and for the purposes specified.

5. The combination of the shells C, provided with the ribs c, disks F, lying between the spokes and flange e of the shells, and elastic filler D and elastic layers or disk H, substantially as and for the purposes specified.

6. A vehicle-wheel hub consisting of an external shell provided with partitions or lugs fitting in notches in the flanges of the journal-box, and having the intermediate space filled with an elastic material, substantially as and for the purposes specified.

7. The combination of the shells C C, provided with partitions c and lugs c', journal-box B, having notches b' in flange b, the fillers D, and washers a, substantially as and for the purposes specified.

8. A hub consisting of the shells C, having an elastic filling, and provided with flanges e, in combination with the spokes S and elastic washers F, placed between said flanges and spokes, substantially as and for the purposes specified.

JAMES T. BROWN.

Attest:
WALTER CHAMBERLIN,
ED. R. HILL.